United States Patent Office 3,567,539
Patented Mar. 2, 1971

3,567,539
METHOD OF MAKING A TUBULAR
THERMOPLASTIC LAMINATE
Henry G. Schirmer, Spartanburg, S.C., assignor to
W. R. Grace & Co., Duncan, S.C.
Filed Aug. 11, 1967, Ser. No. 660,043
Int. Cl. B29c 17/00
U.S. Cl. 156—156                                    5 Claims

ABSTRACT OF THE DISCLOSURE

A laminated thermoplastic film is produced by passing slightly inflated, irradiated polyethylene tubing through a circular die, coating a molten ethylene vinyl acetate copolymer onto the tubing whereby the polyethylene is heated to its orientation temperature while the copolymer is cooled to a temperature suitable for hot blowing, and immediately expanding the laminate as it leaves the die by internal air pressure.

---

This invention relates to tubular laminated thermoplastic films and a method for producing the same. In particular, the invention relates to a method for producing heat-shrinkable thermoplastic laminate having one layer that is oriented and a second layer that is not.

As used herein the terms, "blowing," "blown tubing," and "blown film," relate to the stretching and hence orientation of tubular thermoplastic material by the trapped bubble technique wherein continuous tubing is blown into a bubble by internal air pressure and the bubble is caught or trapped between two sets of pinch rollers or between a set of pinch rollers and an extrusion die. The term, "hot blown," refers to thermoplastic tubing that is stretched by the bubble technique while it is still molten as it leaves the extruder. Generally, hot blown film is substantially unoriented.

For further information regarding the production of a single layer tubular thermoplastic film which is heat shrinkable, reference is made to U.S. Pat. No. 3,022,543 issued to W. G. Baird, Jr. et al. issued Feb. 27, 1962.

Some single layer thermoplastic films have high tear resistance but low tensile strength while others have low abuse and tear resistance but high tensile strength. It would appear, therefore, that in a laminate the desirable properties of two different thermoplastic materials might be combined. However, the necessary orientation of laminated film has not achieved satisfactory commercial success in the past.

In the prior art, the orientation of multi-layer tubular films is usually done by cast coating a tubular substrate, heating the coated substrate to a suitable temperature, and then inflating the tubing thus blowing a bubble and stretching the tubing. A second method is to extrude simultaneously several streams from a multi-orifice die, and blend the streams to make the multi-component laminate. Such a laminate could either be cooled, re-heated and then blown, or blown when it had cooled sufficiently for the purpose in hand. However, cast coating is expensive and it has thickness limitations. The second method is preferable over the first, but temperature control of the individual streams on a multi-stream die is extremely difficult and there are limitations in the temperature ranges possible.

Orientation processes normally involve a relatively narrow range of temperatures with the crystalline melting point of the polymer as an upper limit. Special ovens or liquid baths are required and usually the heating is done on a flattened tape. This means that the edges undergo somewhat different heat and stress treatments. It is thus very desirable that the thick tubing be heated in a circular form, but the prior art devices for this purpose are cumbersome and unreliable. Often, for example, if the tubing gets too hot, the orienting bubble will back into the hot section, get even hotter, and eventually break.

In prior practice the application of a non-oriented laminating component onto an oriented component is done on the oriented substrate. It is more economical, especially if very thin layers are required, to apply such a non-oriented layer before the orientation process. Therefore it is an object of this invention to provide a method of applying the non-oriented layer of a laminated thermoplastic film prior to orientation of the other layer.

It is another object of the invention to provide a laminated thermoplastic film having high strength and tear and abuse resistance.

A still further object of the invention is to provide a method of simultaneously hot blowing all layers, or hot blowing and stretch-orienting respective layers of a multi-layer thermoplastic film.

Yet another object is to provide a tubular thermoplastic film having high tensile strength and high abuse and tear resistance.

These and other objects are achieved by passing a tubular substrate through the center hole in a circular die not making contact in any way with the die's surface. The tubular substrate is suspended between pinch rolls at one end and deflate or converging rolls at the other with the extrusion die for the laminate component positioned in between. The extruded layer makes contact with the tubular substrate downstream from the die, thereby heating the substrate and cooling the coating. The tubing is filled with air at a sufficient pressure so that when the now formed laminate tube has reached orientation temperature it expands and forms a bubble. The degree of orientation depends on the resulting temperature of the substrate and/or laminate combination, the air pressure in the bubble, and the speed of transit through the orientation area.

A preferred substrate material is irradiated and initially unoriented polyethylene and a preferred coating is ethylene vinyl acetate copolymer containing between 3% and 28% vinyl acetate by weight. However, since there is a hysteresis effect wherein a molten polymer being cooled has a fusion temperature lower than its melting temperature on a heating cycle, the same polymer could be used for both the substrate and the coating with the result being an oriented and non-oriented laminate of the same polymer. It will be readily understood by those skilled in the art that other materials may be substituted for the preferred materials and that the invention is not limited to use with such materials.

The invention may be better understood by reference to the following detailed description and drawings in which.

Figure 1:
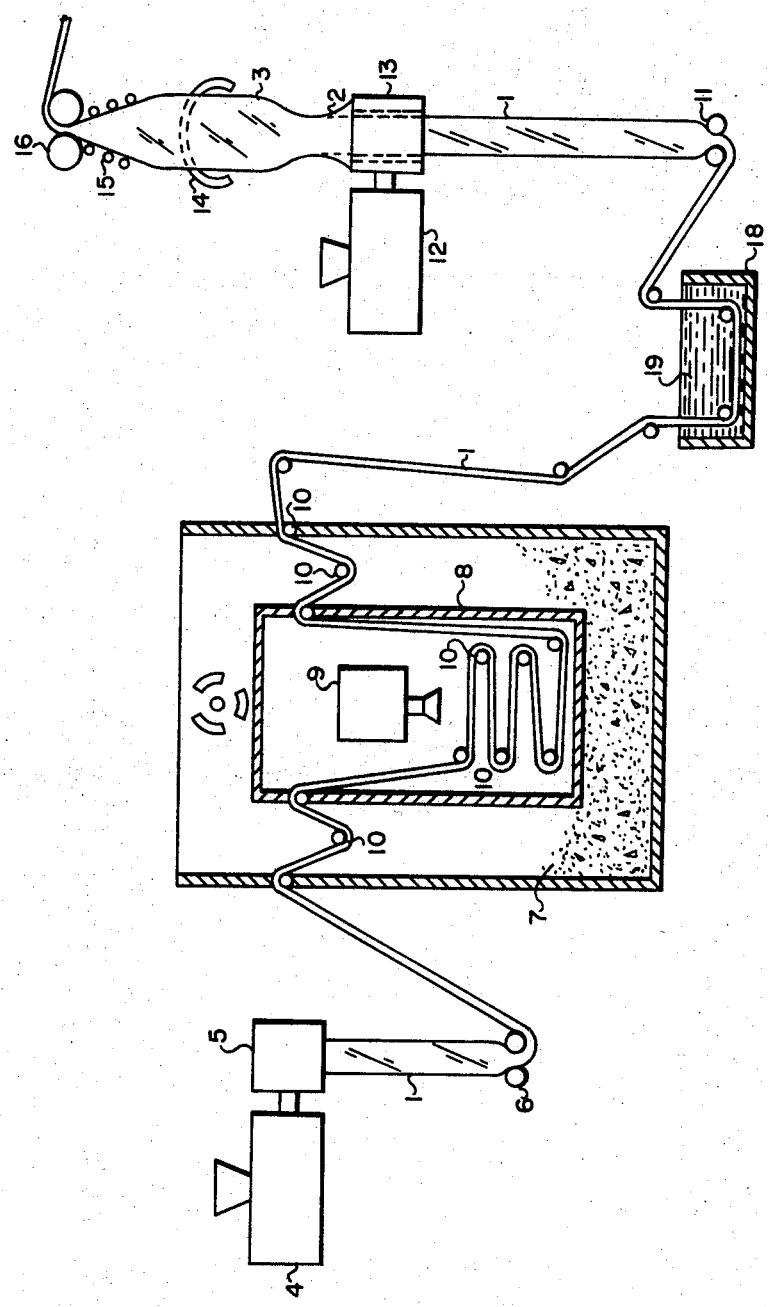
FIG. 1 is a schematic diagram of the preferred method for carrying out the invention.

Referring now to FIG. 1 a conventional polyethylene extruder 4 with extruder die 5 is shown with polyethylene substrate 1 being extruded therefrom. The substrate 1 is in tubular form and after cooling is collapsed by pinch rollers 6. From the pinch rollers 6 the substrate 1 enters radiation vault 8 which is surrounded by shielding 7. Here the substrate receives a radiation dosage between 2 mr. and 20 mr. from accelerator 9. The accelerator 9 can be of an iron core transformer accelerator which energizes and accelerates electrons to irradiate the substrate 1. The unit, mr., is the megarad with a rad representing 100 ergs/gram imparted by ionizing particles to the irradiated material. It will be understood by those skilled in the art that the purpose of the irradiation is to achieve cross-linking of the molecules of the polymer and that other suitable cross-linking techniques may be used.

Substrate 1 is guided through vault 8 by rollers 10 and then to pinch rollers 11. The substrate at this point is unoriented as the rollers 6 and 11 are driven at about a 1:1 ratio so no substantial longitudinal stretching occurs. Typically, the substrate diameter would be somewhat less than 3½" and as it leaves the pinch rollers 11 it is inflated to this dimension. Therefore, no significant transverse orientation occurs. Die 13 is a circular die with a 3½" hollow center. The molten thermoplastic material for the coating 2 is fed from extruder 12 to die 13. In the present embodiment an ethylene vinyl acetate copolymer having between 3% and 28% vinyl acetate content by weight is a preferred coating. The die temperature for this copolymer would be about 420° F.

As the coating 2 is extruded onto the substrate 1 it heats the substrate 1 to its orientation temperature and simultaneously the substrate 1 cools the coating 2. Laminate 3 is consequently formed and the internal air pressure causes the laminate to expand into a bubble. Cooling ring 14 blows cool air onto the laminate 3 to further cool it. Deflate rollers 15 guide the now stretched laminate into driven rollers 16 from whence the laminate is wound onto roll 17.

A typical production speed of the pinch rollers 11 would be about 20 to 30 feet/minute and to compensate for the stretching in the longitudinal direction the rollers 16 would be driven at approximately 70 to 100 feet/minute for longitudinal stretching of about 3.5 to 1. A typical transverse stretching is about 5:1.

As is evident, the stretching or orientation occurs as the substrate 1 is being heated and the coating 2 is being cooled. Since the stretching or hot blowing occurs on the cooling curve of the coating 2, the coating will stay molten to a lower temperature thus assuring that all the stretching takes place while the coating 2 is still molten. The result is that the coating 2 is relatively free of orientation while the substrate is oriented. Ethylene vinyl acetate copolymer having, for instance, 9½% vinyl acetate content by weight, has a melting point on heating at about 100° C., (212° F.); and a fusion point on cooling at about 78° C., (172° F.) thereby exhibiting a "hysteresis" effect. Polyethylene which has a melting point at about 219° F. (104° C.), may be oriented at about 205° F. Thus, the polyethylene substrate can be oriented at a temperature at which the ethylene vinyl acetate copolymer is still molten.

Figure 2:
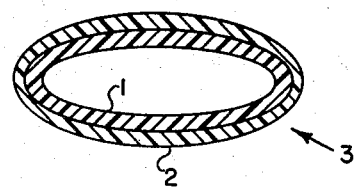
FIG. 2 is a cross-section of the laminated thermoplastic tubing of the invention.
Figure 3:
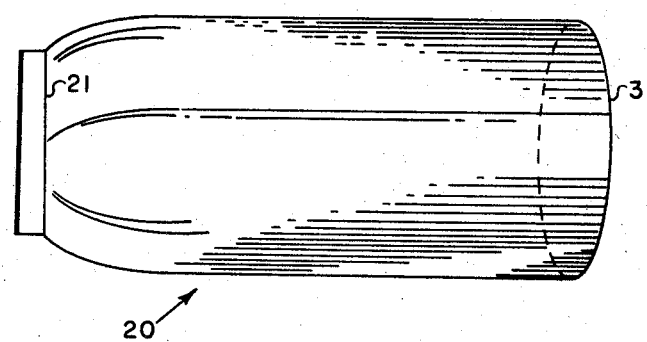
FIG. 3 is a schematic illustration of a pouch or bag made from the laminated tubing of the present invention; and, FIG. 4 is a graph comparing the free shrink curve of a laminate prepared according to the present invention with that of polyethylene.

FIG. 2 shows a cross-section of the laminated tubing 3 with substrate 1 and coating 2. In FIG. 3 a pouch 20 is shown which can be made by closing one end of a section of laminated tubing 3 with a heat seal 21. Such a pouch would be used for packaging poultry and similar articles. For instance, a cleaned and dressed whole turkey could be inserted into the open end of bag 20, the open end twisted and clamped, and the resulting package passed through a heat tunnel which causes the laminate to shrink snugly about the turkey.

Figure 4:
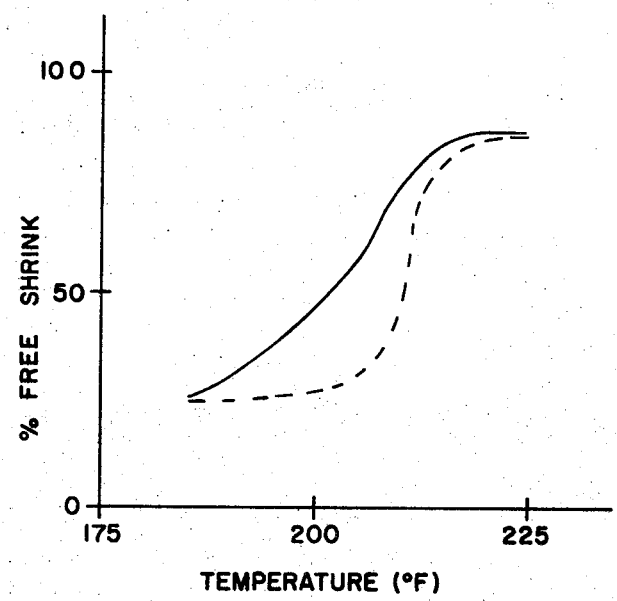

FIG. 4 illustrates one of the distinguishing characteristics of laminated film prepared according to the present invention. The curves 25 and 26 represent the percentage of free shrink as a function of temperature for a laminate of polyethylene and ethylene vinyl acetate copolymers and for polyethylene respectively. The laminate curve 25 exhibits a sharp rise in a narrow temperature band whereas polyethylene's percentage of free shrink increases with a relatively constant slope. Other characterisitcs of the laminate are given in the table below:

|  | Laminate [1] | Polyethylene [2] |
|---|---|---|
| Tear strength, gms./mil | 200 | 4 |
| Shrink tension (205° F.), p.s.i | 70 | 300 |
| Tensile strength, p.s.i | 3,500-4,700 | 7,000-10,000 |

[1] Irradiated polyethylene substrate—ethylene vinyl acetate copolymer 17% vinyl acetate.
[2] Irradiated, oriented.

While the shrink tension and tensile strengths of the laminate 20 are lower, the significantly improved property is the tear strength. Tear strengths given herein are measured in accordance with ASTM standards.

The preferred embodiments described above do not limit the present invention to the specific materials. For instance polypropylene, polyvinyl chloride, and polymers of vinylidene chloride, can be used as substrate materials and coatings can be polyamides, polyvinyl chloride, polyurethane, polyvinylidene cholride, or any of their associated polymers. The term polymer as used herein includes copolymers, homopolymers, terpolymers, and graft or block polymers.

Returning again to FIG. 1, it may be desirable for use with certain substrate and coating materials to either heat or cool the substrate 1 prior to its entry into die 13. Thus substrate 1 would pass through preheat tank 18 which contains preheat water 19. On the other hand, the water 19 could be cooling water. The inclusion of the preheating or precooling step would be necessary when the heat supplied by the coating 2 was not great enough to heat the substrate 1 to its orientation temperature.

Numerous other modifications and additions are possible to the present invention and the scope of the invention is limited only by the following claims.

I claim:
1. A method for producing a laminated, tubular thermoplastic film comprising, in order, the steps of:
   (a) inflating, but not substantially stretching, a preformed, unstretched tube of thermoplastic material, said material being capable of orientation;
   (b) extrusion coating a molten thermoplastic material onto said tube, the molten material being hot enough to raise the tubular material to its orientation temperature, and the molten material being simultaneously cooled by contact with the tube, but not cooled to its orientation temperature; and, immediately,
   (c) allowing the heated and coated tube to expand thereby stretching and orienting the tubular material; and,
   (d) cooling the expanded tubular laminate.
2. The method of claim 1 wherein the tubular material is irradiated and unoriented polyethylene.
3. The method of claim 1 wherein the tubular material is polypropylene.
4. The method of claim 2 wherein the coating is ethylene vinyl acetate copolymer containing between 3% and 28% vinyl acetate by weight.
5. The method of claim 1 wherein the tubular material is selected from the group consisting of polymers of ethylene, propylene, vinyl chloride, vinylidene chloride, and the coating material is selected from the group consisting of polymers of urethane, ethylene, propylene, amides, vinyl chloride, and vinylidene chloride.

References Cited

UNITED STATES PATENTS

| | | | |
|---|---|---|---|
| 2,753,596 | 7/1956 | Bailey | 156—156 |
| 2,941,570 | 6/1960 | Plym | 156—156 |
| 2,944,298 | 7/1960 | Bernhardt et al. | 156—156X |
| 3,234,309 | 2/1966 | Graff | 156—156X |
| 3,258,377 | 6/1966 | Scott | 156—156 |
| 3,329,173 | 7/1967 | Skoggard et al. | 156—156 |
| 3,399,094 | 8/1968 | Skoggard et al. | 156—79 |
| 3,437,537 | 4/1969 | Takada | 156—149 |

LELAND A. SEBASTIAN, Primary Examiner

S. J. LECHERT, JR., Assistant Examiner

U.S. Cl. X.R.

156—229, 244, 306, 322; 161—178; 117—94